(12) United States Patent
Herloski et al.

(10) Patent No.: US 7,746,520 B2
(45) Date of Patent: Jun. 29, 2010

(54) DOCUMENT ILLUMINATOR

(75) Inventors: Robert Herloski, Webster, NY (US);
John C. Juhasz, Fairport, NY (US);
Douglas E. Proctor, Rochester, NY (US); Charles J. Urso, Jr., Webster, NY (US)

(73) Assignee: Xerox Corporation, Norwalk, CT (US)

( * ) Notice: Subject to any disclaimer, the term of this patent is extended or adjusted under 35 U.S.C. 154(b) by 972 days.

(21) Appl. No.: 10/995,462

(22) Filed: Nov. 23, 2004

(65) Prior Publication Data

US 2006/0109675 A1    May 25, 2006

(51) Int. Cl.
*H04N 1/04* (2006.01)
(52) U.S. Cl. ............... 358/475; 358/474; 358/479; 358/484
(58) Field of Classification Search ........ 358/475, 358/474, 479, 484; 362/555; 250/216, 234
See application file for complete search history.

(56) References Cited

U.S. PATENT DOCUMENTS

| | | | |
|---|---|---|---|
| 3,774,021 A | 11/1973 | Johnson | |
| 4,342,908 A | 8/1982 | Henningsen et al. | |
| 5,153,750 A | 10/1992 | Hiroi et al. | |
| 5,257,340 A * | 10/1993 | Kaplan | 385/128 |
| 5,526,141 A | 6/1996 | Ogura et al. | |
| 5,804,818 A * | 9/1998 | Kaplan | 250/227.28 |
| 5,982,512 A | 11/1999 | Kim | |
| 6,015,200 A | 1/2000 | Ogura | |
| 6,017,130 A | 1/2000 | Saito et al. | |
| 6,046,826 A | 4/2000 | Lu et al. | |
| 6,139,174 A * | 10/2000 | Butterworth | 362/555 |
| 6,236,470 B1 | 5/2001 | Seachman | |
| 6,268,600 B1 * | 7/2001 | Nakamura et al. | 250/216 |
| 6,299,328 B1 * | 10/2001 | Wilson | 362/223 |
| 6,417,508 B1 | 7/2002 | Ogura et al. | |
| 6,469,808 B1 | 10/2002 | Onishi et al. | |
| 6,476,369 B1 | 11/2002 | Matsumoto | |
| 6,563,609 B1 * | 5/2003 | Hattori | 358/475 |
| 6,598,998 B2 | 7/2003 | West et al. | |
| 6,646,769 B1 | 11/2003 | Fang | |
| 6,661,497 B2 * | 12/2003 | Tabata et al. | 355/69 |
| 6,710,899 B2 | 3/2004 | Chung et al. | |
| 2002/0097578 A1 | 7/2002 | Greiner | |

(Continued)

FOREIGN PATENT DOCUMENTS

WO    9826212 A1    6/1998

OTHER PUBLICATIONS

Chinese Office Action with English translation, dtd Aug. 1, 2008, from corresponding foreign application, 12 pp.

(Continued)

*Primary Examiner*—Houshang Safaipour
(74) *Attorney, Agent, or Firm*—Pillsbury Winthrop Shaw Pittman LLP

(57) ABSTRACT

A document illuminator comprising a light-transmissive element having an embedded side emitting LED fitted in a cavity formed therein. The light-transmissive element is formed with one or more optical notches and is totally encased in a white surround to yield total internal reflection of the light rays emanating from the LED. The reflected light rays are collected at an aperture which in turn transmits high power and highly uniform illumination profile to illuminate a document.

25 Claims, 5 Drawing Sheets

U.S. PATENT DOCUMENTS

2005/0093813 A1* 5/2005 Yamamoto et al. .......... 345/102
2005/0122742 A1* 6/2005 Ho .............................. 362/615
2006/0159393 A1 7/2006 Ikeda
2006/0227393 A1 10/2006 Herloski

OTHER PUBLICATIONS

Chinese Office Action issued in related application 200510127000.9, Feb. 6, 2009, 12 pages (including full English translation).

* cited by examiner

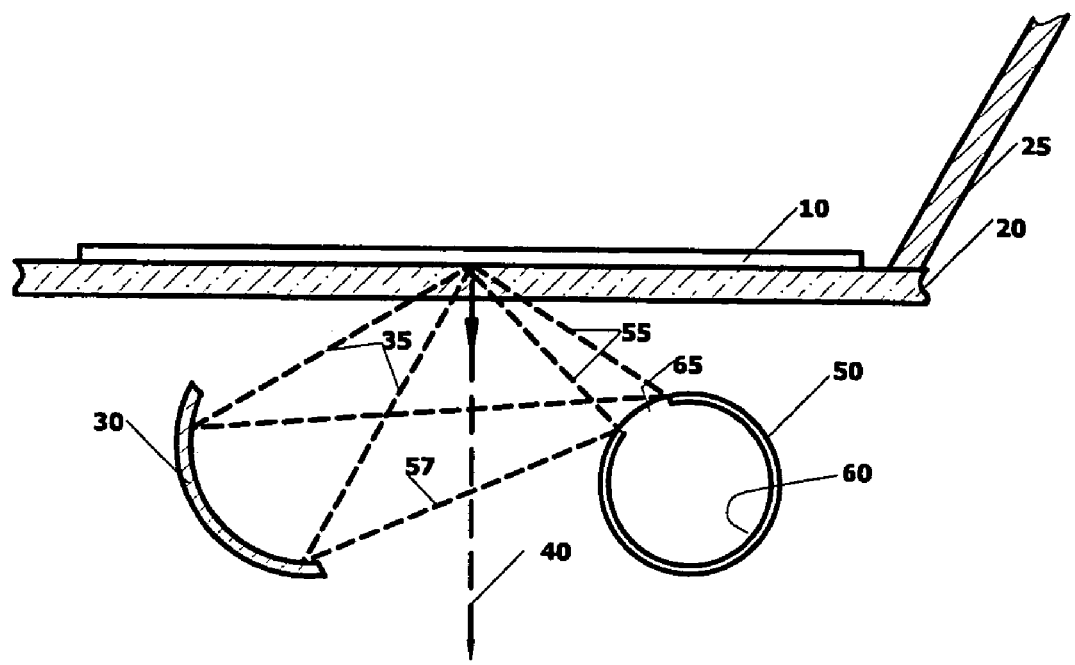
*FIG. 1-Prior Art*
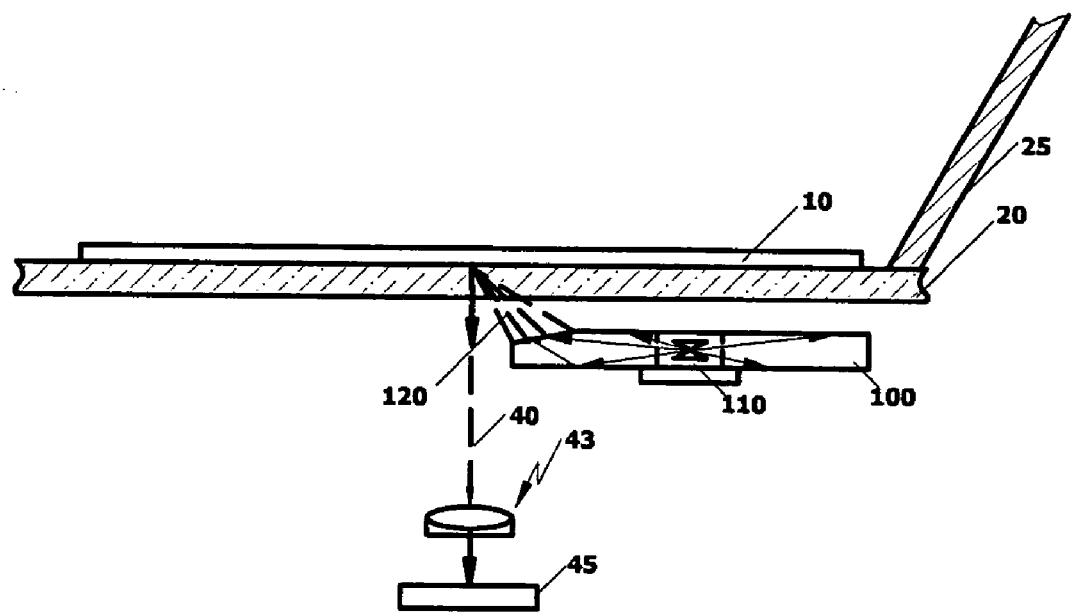
*FIG. 2*

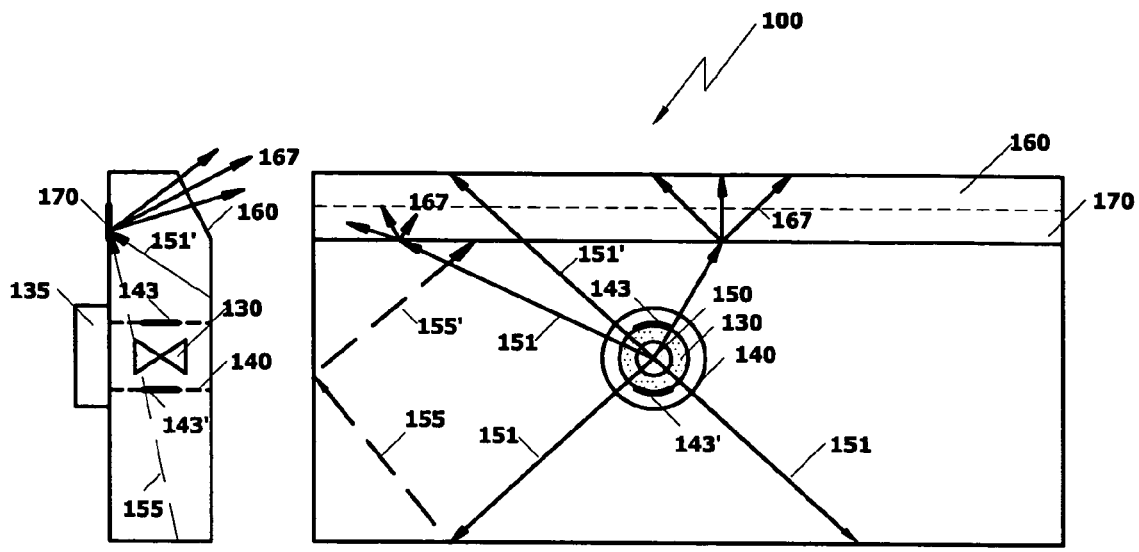
*FIG. 5b*  *FIG. 5a*
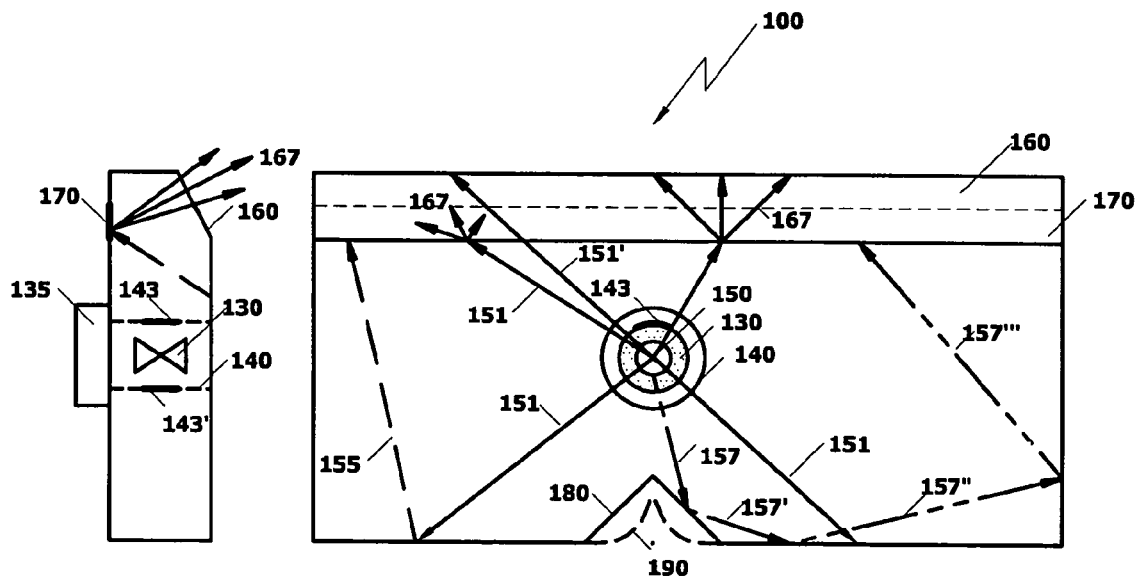
*FIG. 6b*  *FIG. 6a*

DOCUMENT ILLUMINATOR

BACKGROUND

Disclosed is a document illuminator using light emitting diodes in a light-transmissive element.

Document illumination systems or devices which are used for illuminating documents in order to scan, typically include an illumination source such as a tungsten lamp or fluorescent lamp and an opposing reflector. The illumination source is normally located on one side of an optical center line of the scanner under a platen or constant velocity transport (CVT) system while the reflector is positioned on the opposite side of the optical center line of the scanner under the platen or CVT system. The illumination source, in conjunction with the opposing reflector, provides illumination of the document or object being scanned by the scanner.

FIG. 1 illustrates the components of a document illumination system which may be used as a stand alone scanner or in a copier. As described in U.S. Pat. No. 6,236,470, the system may be employed in either a light lens scanning system or a digital (image input terminal) scanning system (platen or CVT) in order to illuminate a document for reproduction, display, and/or storage in an electronic memory, magnetic medium, or optical disk. The illumination system of FIG. 1 includes a platen 20 upon which a document 10 rests. The documents may be dispensed on the platen by means of a document handler 25. Document 10 is illuminated by a light source 50 which provides an active source of light to irradiate the illuminated region of the document. Typically, this source of light is provided by a linear fluorescent lamp (with or without aperture reflecting coatings 60 on the interior lamp surface to form an aperture 65), or by linear tungsten lamps. As noted above, the light source 50 is situated on one side of an optical center line 40. An imaging system (not shown) causes an image of the portion of the document immediately surrounding this optical centerline 40 to be projected onto a light sensing device such as a charge coupled device (CCD). It is known in the art that if the image is directed to a CCD sensor or a full width array sensor, the light reflected from the document about the optical centerline 40 is converted into electronic signals forming image data which electronically represent the document, and the data may be stored on a recording device such as memory storage in a computer.

On the opposite side of the optical center line 40, an opposing reflector 30 is situated. The opposing reflector 30 provides indirect illumination to the document being scanned by redirecting light which would normally not illuminate the document (light leaving the light source in a parallel or substantially parallel path with respect to the platen 20) back to the illuminated region of the document. Reflector 30 reflects scattered light 57 back 35 to the document 10 at an angle opposite from the angle of light being directly 55 emitted by the light source 50. This reflection suppresses shadowing on documents with nonplanar features.

Although illumination systems provide adequate illumination for a scanner, various problems are associated with conventional illumination systems. One such problem is the size of the lamp/reflector combination, where space can be premium. Another problem is the repair and maintenance of these relatively large illumination systems.

Further, a vast majority of document illuminators in digital input scanners are based on linear fluorescent lamps, including CCFLs (cold-cathode fluorescent lamps), which use small diameter (~2 mm) mercury (Hg) fluorescent lamps. For high speed, high performance scanners, larger diameter (8-10 mm) xenon (Xe) linear fluorescent lamps are used in preference over larger diameter Hg linear fluorescent lamps. However, due to high voltage requirements and thermal sensitivity of the Hg lamps, as well as the desire to reduce mercury content in products, it is desirable to explore other light producing technologies such as light emitting diodes (LEDs) which may perform at high performance levels with less mechanical problems, less energy, high efficiency and less maintenance and cost. Such a side light emitting device is described by Robert S. West in U.S. Pat. No. 6,598,998. A different type of point-shaped light source is shown in US Patent Application Publication US 2002/0097578 A1 by Host Grainer. Still another line illumination device is taught in U.S. Pat. No. 6,017,130 to Tomihisa Saito, et al.

The present disclosure incorporates a small size light source in a different light-transmissive element (LTE) 100 shown in FIG. 2 below, to provide a compact document illuminator.

SUMMARY

Aspects disclosed herein include a device comprising a light-transmissive element (LTE); a cavity formed in the LTE; a light-emitting diode (LED) positioned inside the cavity; an aperture formed in the LTE positioned to receive light emitted from the LED; wherein the light traverses the aperture to illuminate a document.

an apparatus comprising a light-transmissive element (LTE) having an aperture and an LED embedded within the LTE wherein light emitted from the LED is internally reflected to the aperture, to illuminate a document; a lens adapted to receive a reflected image of the document and to focus the reflected image on to an array of sensors to convert the images to electronic signals; and a memory storage device to record the electronic signals as digital data.

BRIEF DESCRIPTION OF DRAWINGS

FIG. 1 is a drawing of a document illumination system showing the relationship of a lamp and a reflector with respect to a document to be scanned, according to prior art.

FIG. 2 is a drawing of an embodiment showing the replacement of the lamp and the reflector of a document illumination system of FIG. 1 with a disclosed light-transmissive element (LTE).

FIGS. 5a and 5b are front and side view drawings, respectively; of another embodiment showing the use of opaque specular linings on the cavity wall and diffusively scatterers on the rear wall of an aperture.

FIGS. 6a and 6b are front and side view drawings, respectively, of still another embodiment showing the use of an optical V-notch to obtain TIR.

DETAILED DESCRIPTION

Figures 3A, 3B:
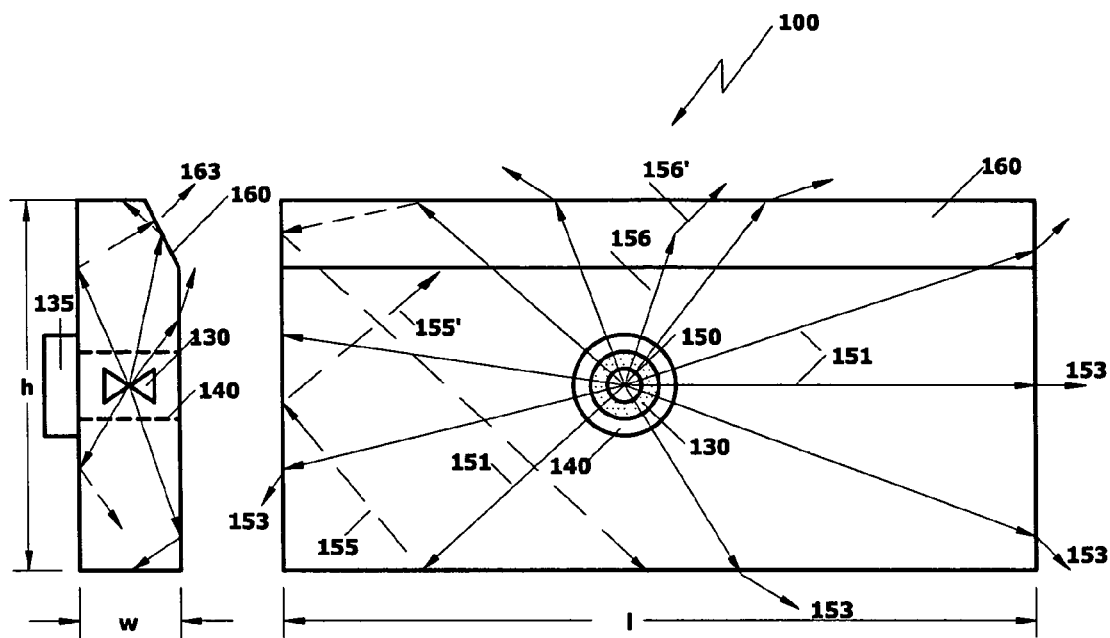
FIGS. 3a and 3b are front and side view drawings, respectively, of an embodiment showing a light-transmissive element fitted with an LED in a cavity formed therein.

In embodiments there is illustrated:

a device for scanning a document using a side-emitting LED along with a linear light-transmissive element to illuminate the document.

The light-transmissive element (LTE) comprises a light guide 100 shown in FIG. 2 interacting with platen 20 and document 10 of FIG. 1; however, in the absence of a lamp/reflector arrangement and the associated complications thereof, as stated earlier. Light guide 100 comprises a light source region 110, which emits light that is directed out of the light guide as rays 120 to illuminate the document 10 on the platen 20, as shown in FIG. 2. An imaging system 43, including a lens, causes an image of the portion of the document immediately surrounding this optical centerline 40 to be projected onto a light sensing device 45 comprising a linear array of photo-sensors (full width array sensor), a CCD sensor, or a photoreceptor (not shown). The light reflected from the document about the optical centerline 40 is converted by the light sensing device 45 into electronic signals forming image data which electronically represent the document, and the data may be stored on a recording device such as a memory storage device in a computer.

FIGS. 3a and 3b show a front view and a side view, respectively, of the light guide 100. The light guide is capable of illuminating, but not limited to, page width documents ranging from letter and legal size to A3, A4 sizes, and can be applicable to 36-inch, as well as 6-inch illuminators so that the length, l shown in FIG. 3a, may be as long as 320 mm or more. The width, w, may vary, but not limited to, from about 2 mm to about 6 mm, while the height, h, may vary from about 20 mm to about 25 mm. An LED 130 is fitted inside a cavity 140 formed in the light guide 100. Light emanating from a light source 150 inside the LED is coupled into the light guide through the walls of the cavity. A chamfered aperture 160 is formed in the light guide to receive light either directly or reflectively, as explained further below, from the LED and redirect it to illuminate a document (not shown) adjacent the aperture.

Light guide 100 comprises a clear acrylic material, although other similar materials may also be used. Cavity 140 is located centrally within the light guide, however, it will be understood that other non-central positions in the light guide may also be used. The cavity may be a through-hole that goes through the width, w, of the light guide shown in FIG. 3b, or a blind-hole that does not span the whole width, depending upon the manner in which it is desired to guide the light into and out of the illuminator. LED 130 may be held inside the cavity in a number of ways, including mounting the LED on a circuit board, which in turn forms a shoulder support 135 for the LED against the sidewall of the light guide 100, as shown in FIGS. 3a and 3b. The circuit board may be a component of an electronic system (not shown) for controlling the light source 150 of the LED 130. Cavity walls are polished to aid in the unimpeded transmission of light from the LED 130 to other parts of the light guide 100.

In general, light rays 151 (shown in solid arrows) emitted by the LED 130 will emanate radially in all directions from cavity 140, some refracting 153 and escaping into the surrounding environment, some others reflecting 155 (shown in dashed arrows) back into the guide, and bouncing back and forth before leaving the guide altogether. Ray 155 goes through, what is called, a retroreflection such that ray 155' is reflected parallel to the original ray 151. Some rays will travel directly into the region of the aperture 160 and project 163 onto the surrounding area, including the document to be illuminated. It will be noted that a ray, such as 156 striking the chamfered surface of aperture 160 will refract into the surrounding environment medium in the direction 156' shown in FIG. 3a.

It is known in science that when light travels from a first medium to a second medium, it does not continue traveling in a straight line, but, as it crosses the boundary between the adjacent media, refracts or bends at an angle away from or towards a normal line drawn to the surface of the boundary between the first and second media. The angle which the incident ray in the first medium makes with the normal line is referred to as the angle of incidence $\theta_{i1}$, and the angle which the transmitted ray in the second medium makes with the normal line is referred to as the angle of refraction, $\theta_{r2}$. The relationship between the two angles depends upon the refractive index, $\eta$, of each of the two media, and is governed by the well-known Snell's law: Sin $\theta_{i1}$/Sin $\theta_{r2}$=$\eta_{r2}/\eta_{i1}$ where the subscripts denote the type of angle (incident, I, or refractive, r) of its respective medium ($1^{st}$ or $2^{nd}$). Light travels faster in a less dense material and has higher refractive index. The minimum possible refractive index is 1.0000 for vacuum. Thus, it can be shown that if a ray of light passes across the boundary from a material in which it travels faster into a material in which travels slower, then the light ray will bend towards the normal line, and vice versa. It can also be shown that there is an incident angle, called the critical angle, $\theta_{cr}$, at which the transmitted ray can be refracted at 90° to the normal, that is, parallel to the boundary surface. For any light ray in the first medium having an incident angle greater than $\theta_{cr}$, none of the light ray will escape from the first medium into the second medium, thus yielding total reflection from the boundary back into the first medium, without any transmission of refracted light into the second medium. This phenomenon which occurs at $\theta_{cr}$ is known as Total Internal Reflection (TIR).

Figure 4:
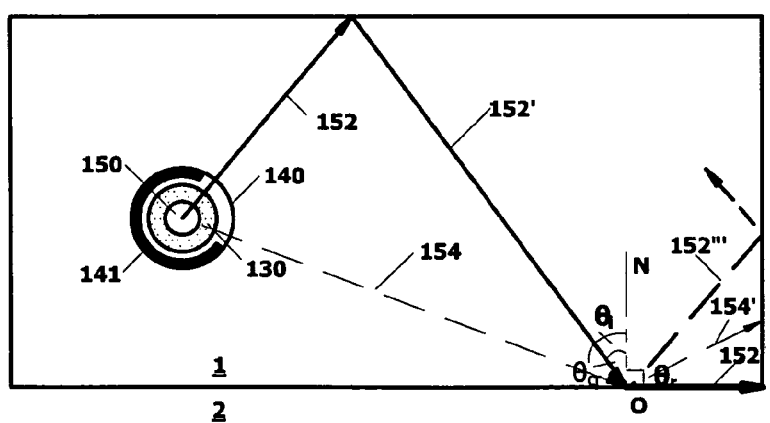
FIG. 4 is a drawing of the placement of an LED in a different position in the light-transmissive element of FIGS. 3a and 3b showing how Total Internal Reflection (TIR) of a light ray may be obtained by positioning the LED in a manner to provide angle of incidence θi of the light ray to be greater than the critical angle $\theta_{cr}$.

As an exemplar, the critical angle $\theta_{cr}$ for a ray from a light source in transparent acrylic entering into surrounding air medium, such as shown in FIG. 4, is from about 36.0 degrees to about 45.6 degrees with $\eta_{acrylic}$ from about 1.4 to about 1.7 and $\eta_{air}$=1.0003 It will be noted that TIR only occurs for light traveling from a first medium having a higher refractive index than the medium it is entering. Furthermore the angle of refraction, $\theta_r$, varies from 0 to 90°, and that with total internal reflection, no light power is lost in the reflection. FIG. 4 illustrates the angle of incidence $\theta_i$ of a light ray in general, and critical angle $\theta_{cr}$ when the angle of refraction $\theta_r$ can be made 90° from the normal n in order to achieve TIR. Light ray 152' arriving at intersection O. formed by normal plane N and the boundary plane between medium 1 and medium 2 at critical angle $\theta_{cr}$ will have a refracted component at 90° 152" and reflected component 152'''. The refracted component 152" remains parallel to the boundary plane and within medium 1. Any other light ray 154 that forms an incident angle $\theta_i > \theta_{cr}$ will then experience total internal reflection in the direction shown as 154'. In an embodiment, cavity 140 may be placed at different places within medium 1 in order to maximize light power and profile, while the cavity wall may be lined with an opaque lining 141 in order to establish the desired angle of incidence.

In embodiments herein further disclosed a light guide having an embedded LED to provide total internal reflection. This may be provided by forming cavity 140 having different cross-sections, including, but not limited to circle, square, rectangle and polygon. Certain portions of the cavity may also be lined with an opaque specular lining or light blockers 143 and 143' as shown in FIGS. 5a and 5b in order to allow light rays 151 directly emanating from light source 150 in LED 140 in such a manner so as to yield total internal reflection 155 from the walls of the light guide, while blocking those rays that would not have the proper angle of incidence, and therefore, not go through a total internal reflection. TIR rays are received at the chamfered aperture 160 for further transmission to illuminate a document not shown.

In another embodiment, direct 151' and/or reflected 155 light rays that collect at aperture 160 are further diffused 167 to enhance illumination power and illumination profile by providing additional opaque diffusively reflecting linings 170 at the rear wall of aperture 160, as shown in FIGS. 5a and 5b. The opaque specular linings that are formed on the cavity walls (143, 143') as well as the diffusively reflecting scatterers on the aperture walls (170) may be continuous, discontinuous and of different shapes including, but not limited to, square, rectangle, triangle, polygon, and stretched versions of the same and other shapes.

The intensity and shape of the illumination emerging from aperture 160 is governed by how well the light emitted from the LED is directed to the aperture. As shown above, light emanating from a light source in a cavity such as shown in FIGS. 3a and 3b will project in all directions and only a portion of the light will emerge from the chamfered aperture 160 with a generally scattered shape and weak power due to the remaining portions of the light escaping (153) from all surfaces of the light-guide. On the other hand, through a judicious placement of light blockers 143 and 143' of an opaque specular lining, the light emanating from LED 130 may be directed in such a manner so as to encourage the light to reflect from the acrylic-air boundary surfaces of the light guide towards aperture 160, and be further strengthened by providing diffused scattering from additional patches 170 at the aperture, thereby yielding light rays leaving the aperture at an output strength and profile higher than that with the unaided light guide of FIGS. 3a and 3b. The opaque blockers 143 and 143' shown in FIGS. 5a and 5b form sectors subtending approximately 60 degrees along the cavity wall, and other sectors of different angles and angles may be used to "fine tune" the specular characteristics of the light rays emanating from the LED for enhanced TIR. The opaque linings both at the cavity and at the aperture have a reflectivity of approximately 90% so that the light emanating from the LED is transmitted to the scanned document at a relatively high strength and uniform illumination profile in the directions shown by arrows 167.

An alternative embodiment involves an optical V-notch 180 that is formed at the lower edge of the light guide of FIG. 5a as shown in FIG. 6a. The notch provides an inclined surface different from the flat bottom surface of the light guide such that a ray that would have otherwise escaped to the surrounding medium is thereby reflected inward inside the light guide, eventually diffusing out at the aperture, thus adding more poser to the resultant illumination issuing from the light guide. Thus, the notch enhances TIR as shown by rays 157, 157', 157" and 157'" in the same Figure.

The embodiment shown in FIG. 6a may be further enhanced by providing a compound curve 190 (shown in phantom) in place of the V-notch shown in FIG. 6a. The compound curve 190 is calculated to provide even more enhanced total internal reflection of light rays incident on the curve. The calculation takes into account the over-all dimensions of the light guide and the placement of the LED within the light guide. In an aspect of the embodiment shown in FIG. 6a, one or more optical notches may be incorporated into light guide 100.

Figures 7A, 7B:
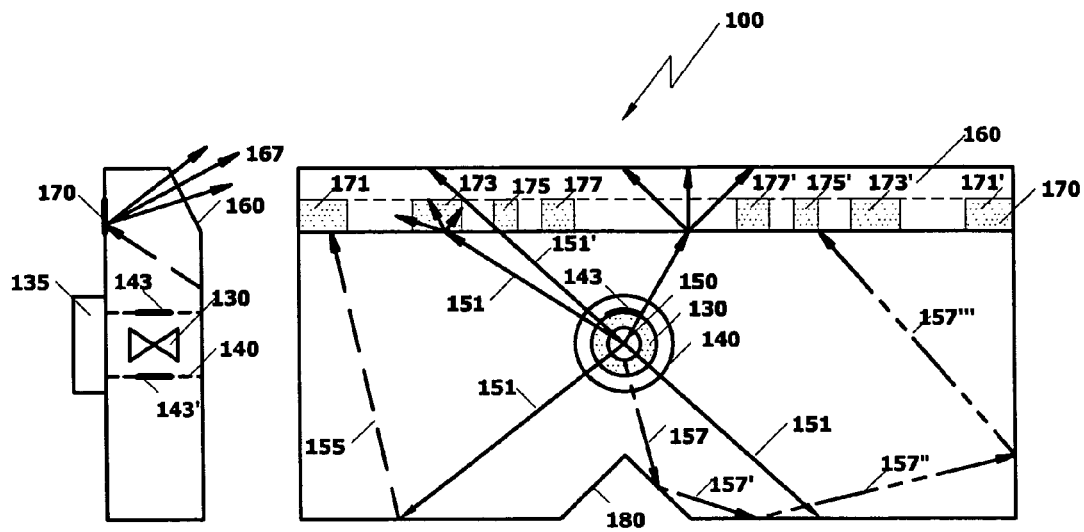
FIGS. 7a and 7b are front and side view drawings, respectively, of yet another embodiment showing the use of graduated light scatterers to encourage light rays to collect at the apertures of FIGS. 5a and 5a in order to illuminate a document with maximum power and uniform illumination profile.

In still another embodiment, the rear surface of light guide 100 may be patterned with a series of diffusive white patches (171, 173, 175, 177, and 171', 173', 175', 177') that frustrate TIR and cause the internally reflected light to scatter and subsequently exit the light guide through the chamfered aperture 160 with minimal power loss and maximal uniform illumination profile, as shown in FIGS. 7a and 7b. In one aspect, the size and position of the patches can be varied to custom tailor the shape of the illumination at the aperture. In another aspect, by making the white diffuse patches graduated, that is, smaller near the light source and progressively larger in length further away, the variability of the illumination profile from one end to another can be minimized resulting in a uniform profile with sufficient output power level along the whole length of the aperture. The aperture itself may be molded in various configurations to shape the illumination profile and enhance exposure efficiency.

Figures 8A, 8B:
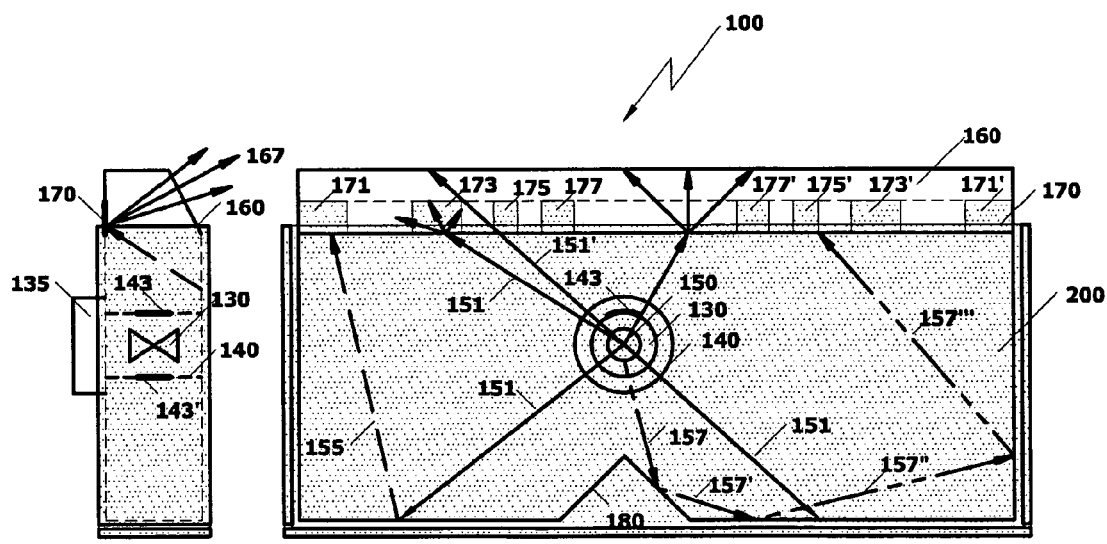
FIGS. 8a and 8b are front and side view drawings, respectively, of an embodiment showing the disclosed light-transmissive element encased in white surround to capture any light that may escape from any of the surfaces of the light-transmissive element, and thereby increase the light power output and improve the illumination profile used to illuminate a document.

In an alternative embodiment shown in FIGS. 8a and 8b, the entire light guide 100 may be encased in an opaque white plastic surround 200 with a reflectivity from about 60% to about 90% that has the effect of re-reflecting light rays that may have exited the light guide back into the light guide, thus enhancing efficiency.

Figure 9A:
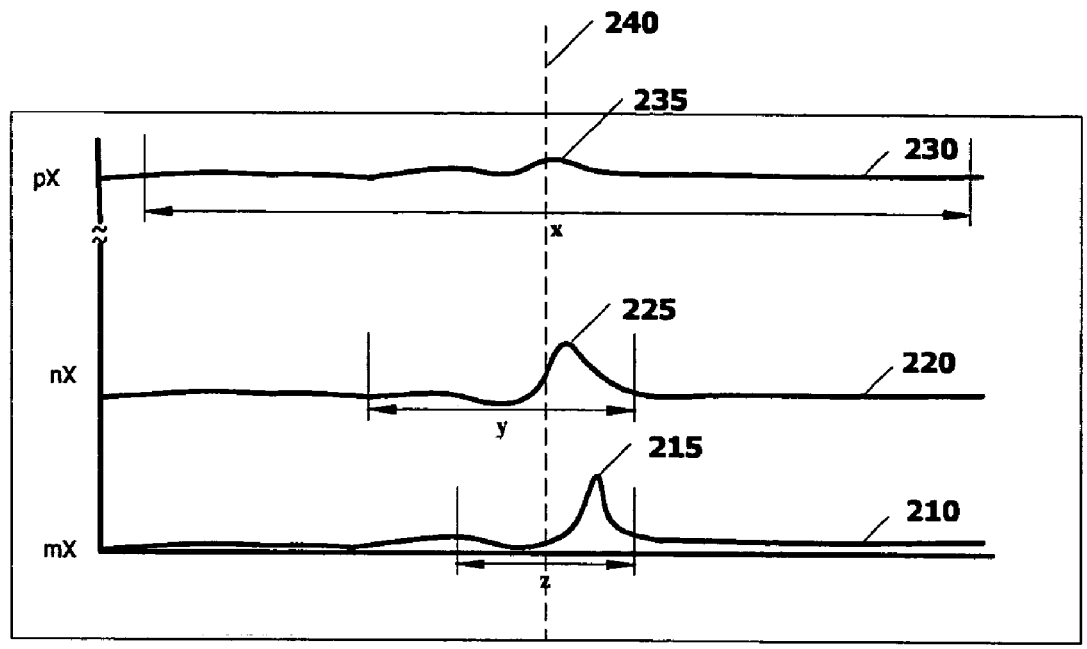
FIG. 9a is a drawing showing the light output as well as the shape of the illumination profile of the embodiments of FIGS. 5-8 relative to the embodiment shown in FIG. 3, along the length of the light-transmissive element.
Figure 9B:
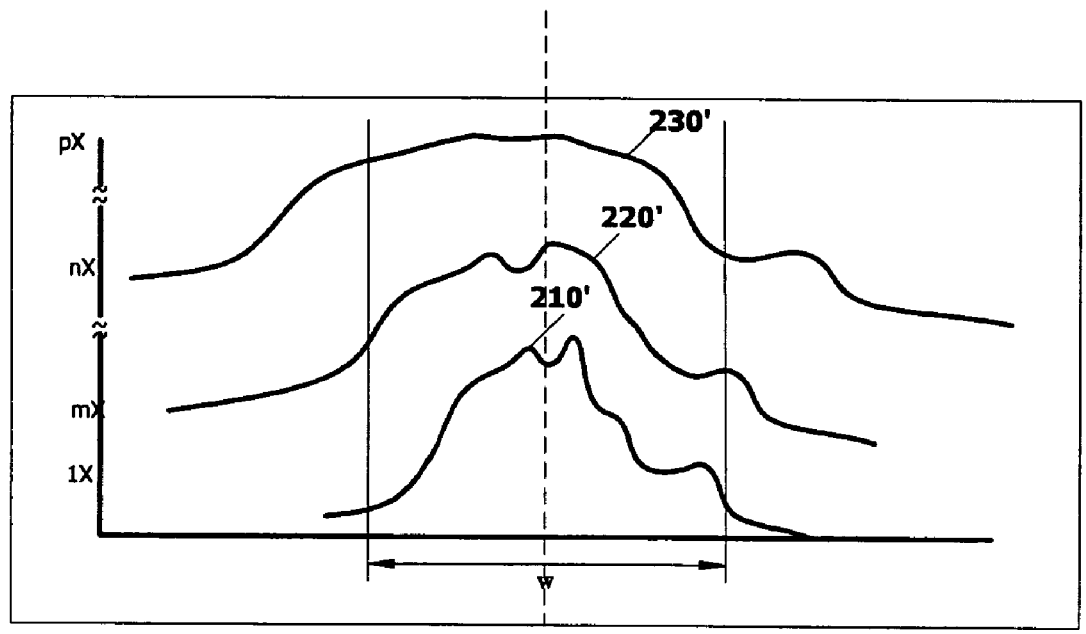
FIG. 9b is a drawing showing the light output as well as the shape of the illumination profile of the embodiments of FIGS. 5-8 relative to the embodiment shown in FIG. 3, along the width of the light-transmissive element.

FIGS. 9a and 9b show the relative magnitude and shape of the various illumination profiles corresponding to the embodiments disclosed above. FIG. 9a shows axial illumination profile along the length, l (approximately 300 mm in this exemplar), of the light guide while FIG. 9b shows a cross-sectional profile along the chamfered width, w (approximately 4 mm), of the aperture. Reference profile 210 shown in FIG. 9a corresponds to the light guide shown in FIGS. 3a and 3b. Profiles 220 and 230 correspond to the light guides of FIGS. 6a and 6b having an optical V-notch and FIGS. 8a and 8b having in addition a white surround, respectively. As seen in FIG. 9a, the relative output power level of the light intensity improves approximately "n" times (nX) with a V-notch and about "p" times (pX) with the light guide encased in a white surround, relative to the unaided light guide of FIGS. 3a and 3b having a power of (mX), where p>n>m and where n may vary from about 3 m to about 5 m, and p from about 5 m to about 10 m. Furthermore, the unenhanced light guide of FIG. 2 corresponding to profile 210 has a relatively sharp and high level spike 215 close to the middle 240 of aperture 160. In profile 220 corresponding to the V-notched light guide of FIGS. 6a and 6b, spike 225 is attenuated and straddles the middle of the aperture by y amount, which is larger then the l amount shown schematically in the case without the V-notch. In profile 230 corresponding to the white surrounded light guide of FIGS. 8a and 8b, the shape of the profile is relatively smoother 235 and more uniform along the whole length, l, of the aperture for the light guide.

Similarly across the width, w, of aperture 160, the illumination profiles 220' and 230' corresponding to the light guides of FIGS. 5 and 7 show substantial improvements on the order of, but not limited to, 5× to 10× in magnitude and also in uniformity for enhanced V-notched and white surrounded light guides, respectively, relative to the cross-profile 210' of the unenhanced light guide of FIGS. 3a and 3b.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skilled in the art which are also intended to be encompassed by the following claims.

What is claimed is:

1. A device comprising:
   a light-transmissive element (LTE);
   a cavity formed in said LTE;
   a light-emitting diode (LED) positioned inside said cavity so as to directly emit light within the LTE;
   an aperture formed in said LTE positioned to receive light emitted from said LED that is internally reflected by the LTE, wherein said light traverses said aperture to illuminate a document; and
   one or more devices arranged between the LED and the aperture such that light emitted from the LED directly toward the aperture is internally reflected within the LTE,
   wherein said light-transmissive element has a height from about 20 mm to about 25 mm, and a width ranging from about 2 mm to about 6 mm.

2. The device in accordance with claim 1, wherein said LTE has a refractive index $\eta_{LTE}$ from about 1.4 to about 1.7.

3. The device in accordance with claim 1, wherein said cavity has a circular cross-section.

4. The device in accordance with claim 1, wherein said cavity has a polygonal cross-section.

5. The device in accordance with claim 1, wherein the one or more devices comprise one or more opaque specular linings lined on said cavity.

6. The device in accordance with claim 1, wherein said LED is a side emitting LED.

7. The device in accordance with claim 1, wherein the one or more devices comprise one or more optical notches formed on one or more of the sides of said LTE.

8. The device in accordance with claim 7, wherein said optical notches comprise a V-shape.

9. The device in accordance with claim 7, wherein said optical notches comprise a compound curve.

10. The device in accordance with claim 1, wherein said LTE provides total internal reflection of light rays.

11. The device in accordance with claim 1, wherein said aperture is lined with an opaque diffusively reflecting scatterer.

12. The device in accordance with claim 11, wherein said lining comprises a white painted surface.

13. The device in accordance with claim 1, wherein said cavity comprises a thru-hole.

14. The device in accordance with claim 1, wherein said cavity comprises a blind-hole.

15. The device in accordance with claim 1, wherein said cavity is formed centrally within said LTE.

16. The device in accordance with claim 1, wherein said cavity is formed non-centrally within said LTE.

17. The device in accordance with claim 1, wherein said document is positioned on a platen.

18. The device in accordance with claim 1, wherein said document is guided by a document handler.

19. The device in accordance with claim 1, wherein said light-transmissive element has a length from about 6-inches to about 36-inches.

20. An device comprising
   a light-transmissive element (LTE) having an aperture and an LED embedded within said LTE so as to directly emit light within the LTE, wherein light emitted from said LED is internally reflected by the LTE to said aperture and traverses said aperture, to illuminate a document;
   one or more devices arranged between the LED and the aperture such that light emitted from the LED directly toward the aperture is internally reflected within the LTE;
   a lens adapted to receive a reflected image of said document and to focus said reflected image on to an array of sensors to convert the images to electronic signals; and
   a memory storage device to record said electronic signals as digital data,
   wherein said light-transmissive element has a height from about 20 mm to about 25 mm, and a width ranging from about 2 mm to about 6 mm.

21. The device in accordance with claim 20, wherein said light-transmissive element has a length from about 6-inches to about 36-inches.

22. The device in accordance with claim 20, wherein said document is positioned on a platen.

23. The device in accordance with claim 20, wherein said document is guided by a document handler.

24. The device in accordance with claim 20, wherein said sensors comprise charge coupled devices (CCDs).

25. The device in accordance with claim 20, wherein said sensors comprise a full width array sensor.

* * * * *